US012450131B2

(12) United States Patent
Wang

(10) Patent No.: US 12,450,131 B2
(45) Date of Patent: Oct. 21, 2025

(54) METHOD AND APPARATUS FOR INVOKING SYSTEM FILE, AND STORAGE MEDIUM

(71) Applicant: BEIJING XIAOMI MOBILE SOFTWARE CO., LTD., Beijing (CN)

(72) Inventor: Xiaolong Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 287 days.

(21) Appl. No.: 16/834,823

(22) Filed: Mar. 30, 2020

(65) Prior Publication Data
US 2021/0133050 A1 May 6, 2021

(30) Foreign Application Priority Data
Nov. 6, 2019 (CN) .......................... 201911077814.4

(51) Int. Cl.
G06F 11/14 (2006.01)
G06F 8/61 (2018.01)
G06F 8/65 (2018.01)
G06F 9/4401 (2018.01)
H04L 67/06 (2022.01)
H04L 67/10 (2022.01)
H04L 67/60 (2022.01)
H04L 9/40 (2022.01)

(52) U.S. Cl.
CPC ............ G06F 11/1469 (2013.01); G06F 8/63 (2013.01); G06F 8/65 (2013.01); G06F 9/4401 (2013.01); G06F 9/4411 (2013.01); H04L 67/06 (2013.01); H04L 67/10 (2013.01); H04L 67/60 (2022.05); H04L 63/0876 (2013.01)

(58) Field of Classification Search
CPC ...... G06F 11/1469; G06F 8/65; H04L 9/3226; H04L 67/06; H04L 67/10; H04L 63/0428; H04L 9/0825; H04L 9/0822; H04L 9/30
See application file for complete search history.

(56) References Cited

U.S. PATENT DOCUMENTS

| 7,962,739 | B2 | 6/2011 | Childs et al. |
| 8,954,805 | B2 | 2/2015 | Liu et al. |
| 9,389,878 | B1* | 7/2016 | Chan ............... G06F 21/572 |

(Continued)

FOREIGN PATENT DOCUMENTS

| CN | 105824722 A | 8/2016 |
| CN | 109783271 A | 5/2019 |

OTHER PUBLICATIONS

Charles M. Kozierok, The TCP/IP Guide (http://www.TCPIPGuide.com), Version 3.0—Version Date: Sep. 20, 2005 (Year: 2005).*

(Continued)

Primary Examiner — Jerry B Dennison
(74) Attorney, Agent, or Firm — Syncoda LLC; Feng Ma

(57) ABSTRACT

A method for invoking a system file includes: detecting, during a startup process, a trigger operation that is input; establishing, in response to the detecting of the trigger operation, a link with a cloud server, and the trigger operation being used to trigger an invocation to the system file; and invoking, based on the link, the system file from the cloud server. As such, the system file can be invoked from the cloud server, and an invocation to the system file can be realized.

14 Claims, 5 Drawing Sheets

(56) References Cited

U.S. PATENT DOCUMENTS

| | | | |
|---|---|---|---|
| 11,733,877 B2* | 8/2023 | Bhagi | G06F 11/3034 |
| | | | 711/114 |
| 11,824,991 B2* | 11/2023 | Fiske | H04L 9/0852 |
| 2003/0005244 A1* | 1/2003 | Markkanen | H04L 67/1095 |
| | | | 711/163 |
| 2007/0180207 A1* | 8/2007 | Garfinkle | G06F 11/1469 |
| | | | 340/5.74 |
| 2007/0220308 A1* | 9/2007 | Yeung | G06F 11/1469 |
| | | | 714/5.1 |
| 2009/0217024 A1* | 8/2009 | Childs | G06F 11/1417 |
| | | | 707/999.204 |
| 2012/0272095 A1* | 10/2012 | Liu | G06F 8/654 |
| | | | 714/6.1 |
| 2013/0173877 A1* | 7/2013 | Guo | G06F 11/1464 |
| | | | 711/E12.103 |
| 2018/0270340 A1* | 9/2018 | Ahmad | H04M 1/72412 |
| 2019/0279326 A1* | 9/2019 | Chen | H04L 9/30 |

OTHER PUBLICATIONS

Boot Mechanism for Discless HP-UX, by Perry E. Scott et al., 1266 Hewlett-Packard Journal 39 Oct. 1988. No. 5, Palo Alto, CA, USA.
Extended European Search Report in Application No. 20171567.9, mailed on Oct. 26, 2020.
First Office Action of Chinese Patent Application No. 201911077814.4 mailed Apr. 29, 2022.

* cited by examiner

METHOD AND APPARATUS FOR INVOKING SYSTEM FILE, AND STORAGE MEDIUM

CROSS-REFERENCE TO RELATED APPLICATION

This application claims priority to Chinese Patent Application No. CN 201911077814.4 filed on Nov. 6, 2019, the disclosure of which is hereby incorporated by reference in its entirety.

BACKGROUND

With the development of technologies, terminal devices such as tablets, notebooks, and desktop computers, etc. have become prevalent among a large number of users.

SUMMARY

The present disclosure relates generally to the field of computer technologies, and more specifically to a method for invoking a system file, an apparatus for invoking a system file, and a storage medium.

According to an aspect of embodiments of the present disclosure, there is provided a method for invoking a system file, including: detecting, during a startup process, a trigger operation that is input; establishing a link with a cloud server, in response to the detecting of the trigger operation being used to trigger an invocation to the system file; and invoking, based on the link, the system file from the cloud server.

In some embodiments, before establishing a link with the cloud server, the method for invoking a system file further includes: initializing a network driver configuration; and establishing a link with a cloud server includes: establishing the link with the cloud server based on the initialized network driver configuration.

In some embodiments, said invoking, based on the link, the system file from the cloud server includes: uploading, based on the link, a device identifier to the cloud server, the device identifier being used to identify a terminal device invoking the system file; and acquiring the system file determined by the cloud server based on the device identifier and matched with the device identifier.

In some embodiments, uploading, based on the link, a device identifier to the cloud server includes: encrypting the device identifier; and uploading the encrypted device identifier to the cloud server based on the link.

In some embodiments, the system file includes a system installation file, a system update file, or a system recovery file; and the trigger operation includes a hot key trigger operation, a typing operation of input/output system options, or a typing operation of key combination.

According to another aspect of embodiments of the present disclosure, there is provided an apparatus for invoking a system file, including: a detection module, configured to detect, during a startup process, a trigger operation that is input; an interaction module, configured to establish a link with a cloud server, in response to the detecting of the trigger operation being used to trigger an invocation to the system file; and an acquisition module, configured to invoke, based on the link, the system file from the cloud server.

In some embodiments, the interaction module is further configured to: initialize a network driver configuration before establishing a link with the cloud server; and the interaction module is configured to establish a link with a cloud server by adopting the following mode: establishing the link with the cloud server based on the initialized network driver configuration.

In some embodiments, the acquisition module is configured to invoke, based on the link, the system file from the cloud server by adopting the following modes: uploading, based on the link, a device identifier to the cloud server, the device identifier being used to identify a terminal device invoking the system file; and acquiring the system file determined by the cloud server based on the device identifier and matched with the device identifier.

In some embodiments, uploading, based on the link, a device identifier to the cloud server includes: encrypting the device identifier; and uploading the encrypted device identifier to the cloud server based on the link.

In some embodiments, the system file includes a system installation file, a system update file, or a system recovery file; and the trigger operation includes a hot key trigger operation, a typing operation of input/output system options, or a typing operation of key combination.

According to yet another aspect of embodiments of the present disclosure, there is provided an apparatus for invoking a system file, including: a memory for storing instructions; and a processor for invoking the instructions stored in the memory for executing any one of the above-mentioned methods for invoking the system file.

According to yet another aspect of embodiments of the present disclosure, there is provided a non-transitory computer-readable storage medium having stored therein instructions that, when executed by a processor, performs any one of the above-mentioned methods for invoking the system file.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects of the disclosure as recited in the appended claims.

At present, with the increase of the number users, there are more and more cases of system crashes in the terminal devices due to software or hardware reasons. The terminal device cannot invoke a system file in the case of the system crash.

The method for invoking a system file provided in the embodiments of the present disclosure is applied to a scenario where a system file needs to be invoked, for example, scenarios where terminal devices, such as a tablet, a notebook, a desktop computer etc., perform an installation, update, and recovery of the system file, and so on. In related art, the terminal device has built-in system recovery functions, which are capable of installing, updating, or recovering system files after the system is normally started. However, when the system completely crashes and cannot be started or a hard disk containing system files is missing, the system files cannot be invoked, and functions of installing, updating, recovering, etc. of the system files cannot be performed.

There is provided a method for invoking a system file in the embodiments of the present disclosure. By invoking a system file from the cloud server, a user can ensure a normal invocation of the system file in the case that the system crashes or the system cannot be used normally, which is caused by the damage or missing of the system files, thereby ensuring a normal installation, recovery, update or the like of the system files.

Figure 1:
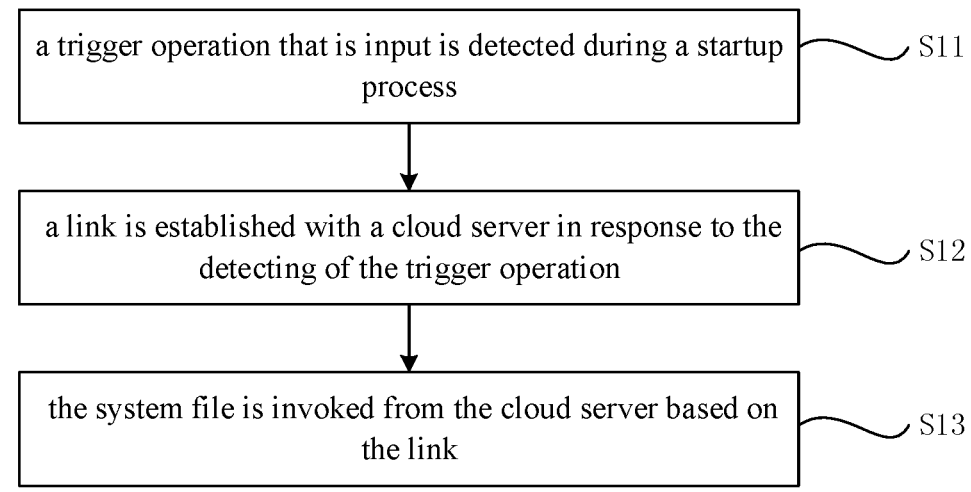
FIG. 1 is a flowchart illustrating a method for invoking a system file according to some embodiments.

FIG. 1 is a flowchart illustrating a method for invoking a system file according to some embodiments. As shown in FIG. 1, a method 10 for invoking a system file is applied to a terminal device. The terminal device can include any one or more of a tablet, a notebook, a desktop computer, etc., which is not limited in the present disclosure. The method 10 for invoking a system file includes the following steps S11 to S13.

In step S11, a trigger operation that is input is detected during a startup process.

In the embodiments of the present disclosure, a trigger instruction is used to trigger an invocation to a system file. In an implementation, the trigger instruction is triggered by a user. Herein, in the present disclosure, after the terminal device is turned on, the system can be in a startup or non-startup state during a system startup process. For example, when the system files have not been installed on the terminal device, the system is in a non-startup state after the terminal device is turned on; when the system files have been installed on the terminal device but the phenomenon of system crash or missing system file occurs, the system is in a non-startup state after the terminal device is turned on; and when the system files have been installed on the terminal device and can be used normally, the system is started and the startup is not completed after the terminal device is turned on, which can be understood as that the system is in a startup state. After the terminal device is turned on, a trigger operation that is input by the user is detected, and it is convenient to establish a link with the cloud server to invoke system files in the cloud server. Herein, the trigger operation can include, but is not limited to, a hot key trigger operation, a typing operation of input/output system options, and a typing operation of key combination. The hot key triggering can be a trigger of any one of keys in a keyboard, so as to perform a shortcut operation for invoking a system file by using a predetermined input mode; or can be a trigger of a key combination, for example, inputting "Ctrl+Alt+Delete."

In the embodiments of the present disclosure, by setting in advance the trigger operations such as a hot key trigger operation, a typing operation of BIOS options, and a typing operation of key combination, it is convenient for the terminal device to quickly establish a link with the cloud server to invoke a system file, thereby satisfying the user's urgent needs of a solution to the system problem and improving the user experience.

In step S12, a link is established with a cloud server in response to the detecting of the trigger operation, and the trigger operation is used to trigger an invocation to the system file.

In the embodiments of the present disclosure, the terminal device responds according to the detecting of the trigger operation, and establishes a link with the cloud server to invoke a system file. For example, when the terminal device detects that the same key has been pressed several times in succession, it performs an operation of establishing a link with the cloud server and invoking a system file. Alternatively, when a key combination is detected, for example, "Ctrl+Alt+delete" is input, and then an operation of establishing a link with the cloud server and invoking the system file is executed.

Further, in the embodiments of the present disclosure, in order to improve the security and privacy, a secure link can be established between the terminal device and the cloud server based on an encryption protocol. Herein, the process of establishing a secure link can use existing technologies, which are not described in detail in the embodiments of the present disclosure.

In step S13, the system file is invoked from the cloud server based on the link.

In the embodiments of the present disclosure, a system file is stored in the cloud server in advance. Based on the link, the terminal device acquires the system files in the cloud server, and installs the acquired system files on the terminal device through the Basic Input Output System (BIOS), so as to complete the invocation. Herein, the system file stored in the cloud server can be a system file stored and updated in real time by the terminal device manufacturer according to the type of the terminal device.

In some embodiments, the system file stored in the cloud server can be a system ISO file or a system image file. For example, the system files stored in the cloud server can be system installation files, system update files, or system recovery files.

After establishing a link with the cloud server, the terminal device can invoke system files from the cloud server. Upon invoking the system files, the terminal device can perform corresponding operations on the invoked system file. For example, when the invoked system file is a system installation file, the system file is installed on the terminal device. When the invoked system file is a system update file, a system file installed on the terminal device is updated. When the invoked system file is a system recovery file, the recovery of system file is performed.

In some embodiments of the present disclosure, a link is established with the cloud server based on a user's triggered operation, and system files are acquired from the cloud server, thereby realizing a normal installation, recovery, or update etc. of an operating system in the case that the operating system crashes or the system cannot be used normally due to the damage or missing of the system files, which is easy to operate, and is convenient for users to quickly recover the normal use of the terminal device.

The embodiments of the present disclosure will be described below with reference to practical applications of the method for invoking a system file according to the foregoing embodiments.

Figure 2:
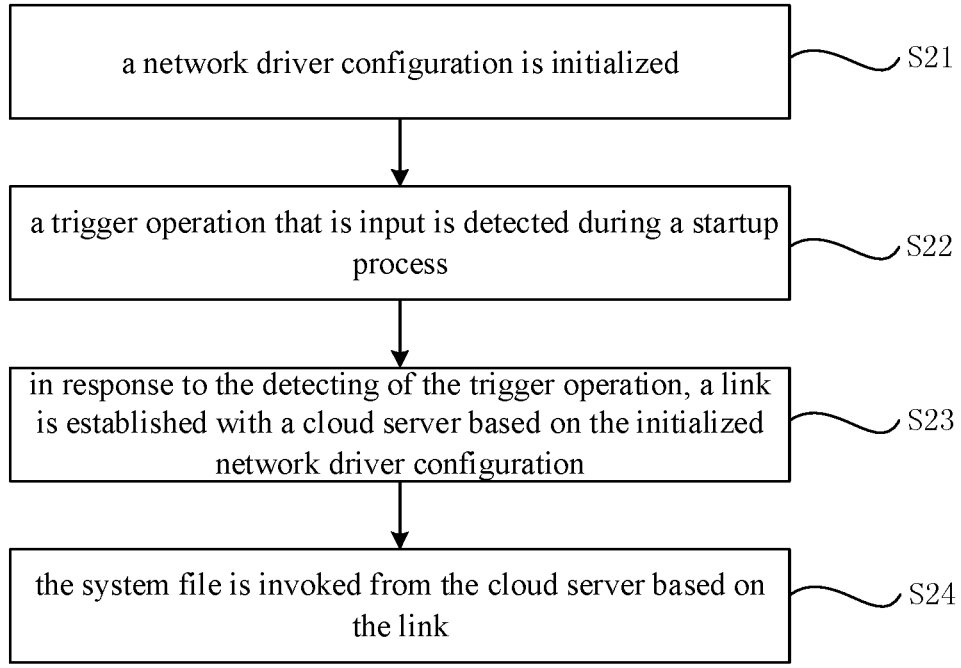
FIG. 2 is a flowchart illustrating another method for invoking a system file according to some embodiments.

The present disclosure discloses another method for invoking a system file. Referring to FIG. 2, a flowchart illustrating a method for invoking a system file in some embodiments is shown. As shown in FIG. 2, the method 20 for invoking a system file includes the following steps S21 to S24.

The implementations of steps S22 and S24 are the same as the implementations of step S11 and step S13 in the method 10 for invoking a system file, respectively, and details are not described herein again.

In step S21, a network driver configuration is initialized.

In an implementation, an establishment of a link between a terminal device and a cloud server is implemented in the embodiments of the present disclosure. Before establishing a link with the cloud server, the terminal device can initialize the local network driver configuration of the terminal device. After the terminal device is turned on, the network driver configuration is detected by the BIOS. If it is detected to be normal, the network driver configuration is re-updated for initialization. The invocation of system files can be achieved by establishing a link between the initialized network driver configuration and the cloud server.

In step S23, in response to the detecting of the trigger operation, a link is established with a cloud server based on the initialized network driver configuration, and the trigger operation is used to trigger an invocation to the system file.

In the present disclosure, the terminal device responds according to the detected trigger operation. The network driver configuration of the terminal device can be initialized by using a function of initialing the system in BOIS, in order to enable the network link function of the terminal device, and then invoke the system files in the cloud server. Herein, the networks enabled after the network driver configuration is initialized can include: wired networks or wireless networks, which are not limited in this disclosure.

In the embodiments of the present disclosure, the terminal device responds according to the detected trigger operation, and the network driver configuration of the device terminal is initialized by using the BIOS, so that the network of the terminal device is not restricted by the system, and it is convenient for the terminal device to establish a link with the cloud server, which is helpful for the user to normally install, update or recovery the system when the system crashes and cannot be started. The terminal device establishes a link with the cloud server, for example, the terminal device and the cloud server perform three interactions according to the three-way handshake protocol, so as to establish a link.

The system file stored in the cloud server in the embodiments of the present disclosure can be an open source general-purpose system file or a dedicated system file that is matched with a terminal device. When the system file stored in the cloud server is a dedicated system file, the device identifier of the terminal device can be used to match the dedicated system file of each terminal device.

Figure 3:
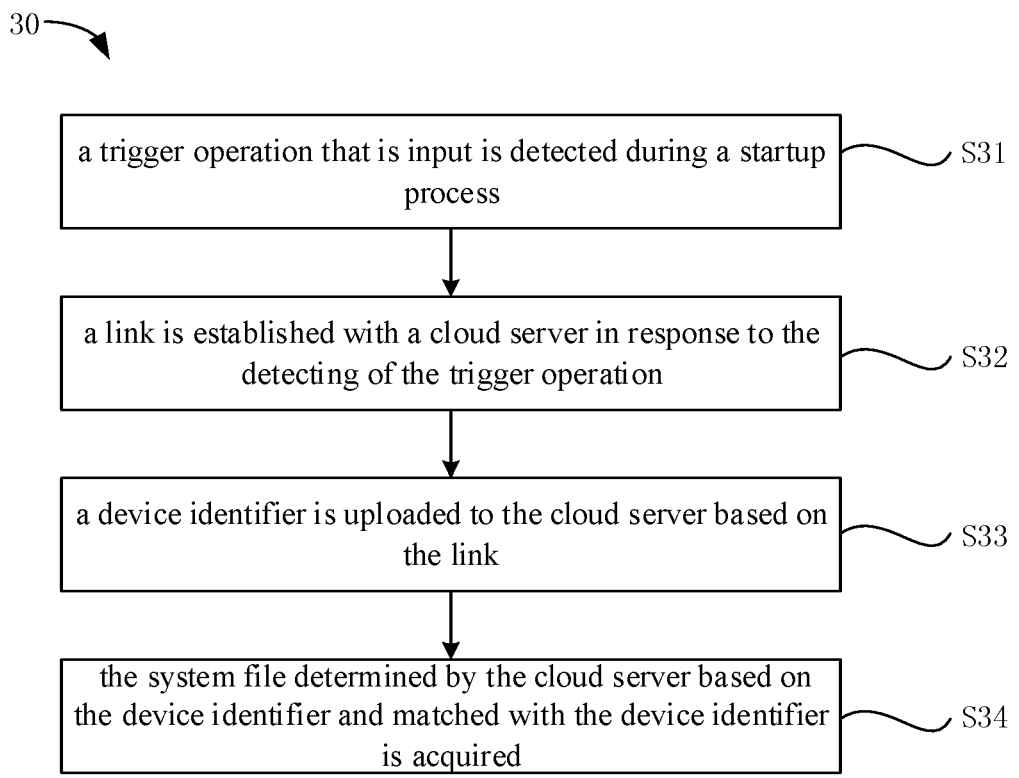
FIG. 3 is a flowchart illustrating yet another method for invoking a system file according to some embodiments.

FIG. 3 shows a flowchart illustrating a method for invoking a system file in another exemplary embodiment. Referring to FIG. 3, the method 30 for invoking a system file includes the following steps S31 to S34.

The implementations of step S31 and step S32 are the same as the implementations of step S11 and step S12 in the method 10 for invoking a system file, respectively, and details are not described herein again.

In step S33, a device identifier is uploaded to the cloud server based on the link, and the device identifier is used to identify a terminal device invoking the system file.

The device identifier is pre-programmed in a communication module of the terminal device to identify the terminal device information. For example, the device identifier can be an authentication serial number of the terminal device using the system file.

In the present disclosure, based on a trigger instruction of the user, the terminal device can upload the device identifier of the terminal device to the cloud server through a transmission control protocol, so that the cloud server transmits the system file to the terminal device according to the acquired device identifier.

In step S34, the system file determined by the cloud server based on the device identifier and matched with the device identifier is acquired.

In the present disclosure, by uploading the device identifier, the system file determined by the cloud server and matched with the device identifier is acquired, so that the terminal device can acquire the dedicated system file applicable to the terminal device itself, thereby facilitating the normal use of the installed system, and improving user experience.

In the embodiments of the present disclosure, in order to ensure an accurate and secure data transmission, the device identifier can be encrypted, and the encrypted device identifier is uploaded to the cloud server. The system file matched with the device identifier is determined after the encrypted device identifier is received and decrypted by the cloud server. In an implementation scenario, an asymmetric encryption mode can be used for data transmission. For example, the device identifier is encrypted by using a private key, and the cloud server performs the decryption by using a public key corresponding to the private key, so as to acquire the device identifier.

Through the above embodiments, the device identifier is encrypted, and the encrypted device identifier is transmitted to the cloud server, which is help to ensure the security of data transmission and improve the security of system installation, update, or recovery. Based on the system file provided by the cloud server according to the device identifier, the acquired system file can be matched with the terminal device.

With reference to the method for invoking a system file according to the foregoing embodiments, an embodiment of the present disclosure provides a working flowchart for invoking a system file.

Figure 4:
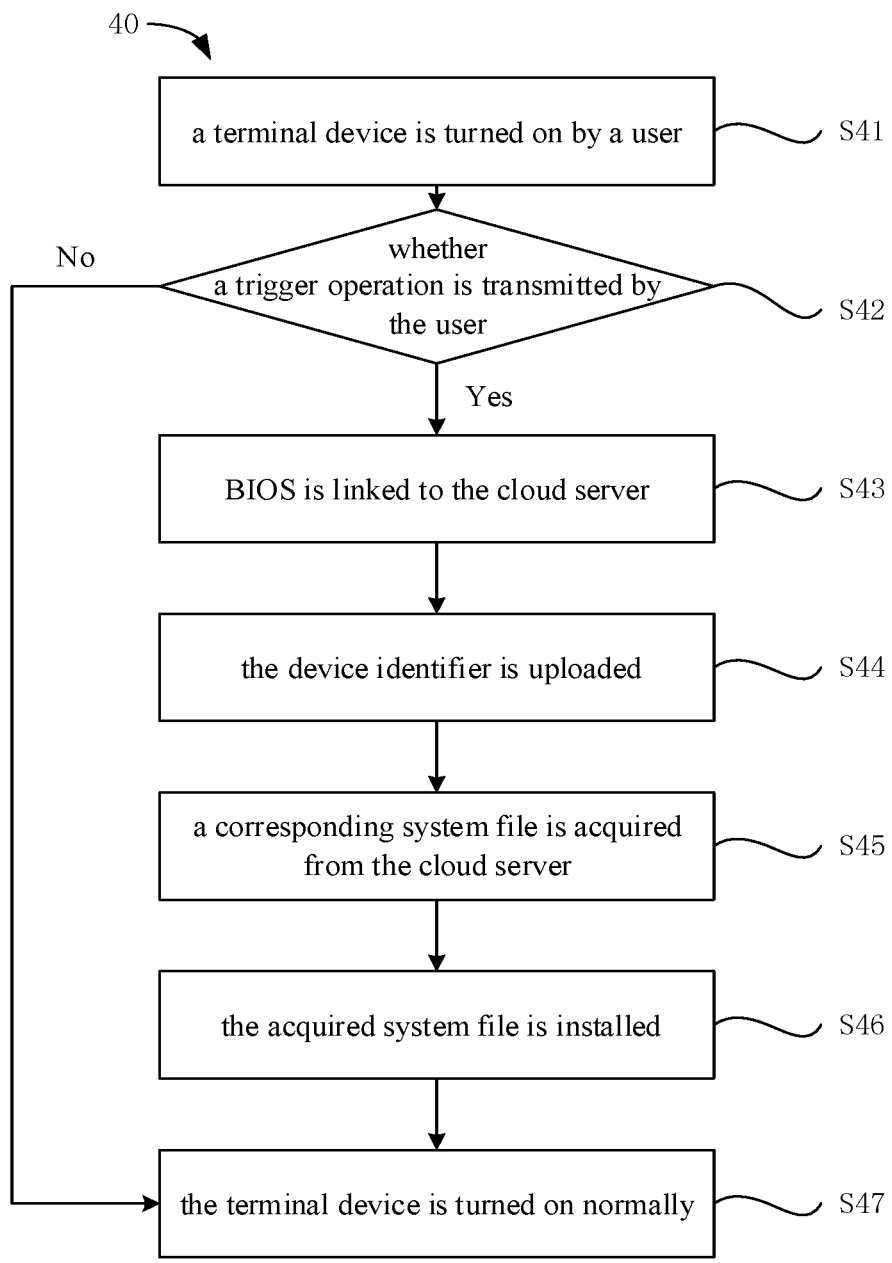
FIG. 4 is a working flowchart for invoking a system file according to some embodiments.

FIG. 4 is a working flowchart for invoking a system file according to some embodiments. Referring to FIG. 4, the workflow 40 for invoking a system file includes the following steps.

In step S41, a terminal device is turned on by the user.

In the present disclosure, a terminal device is turned on by the user through a power switch to provide power to the BIOS and other motherboards and devices thereof, so that the terminal device can run programs.

In step S42, it is determined whether a trigger operation is transmitted by a user.

After the terminal device is turned on, it is determined, according to the operation of a user, whether a trigger operation for invoking a system file is transmitted by the user or not. When a trigger operation for invoking the system file is received by the BIOS, the following steps S33 to S36 are performed. When a trigger operation for invoking the system file is not received by the BIOS, the terminal device is turned on normally and the existing system file thereof is started.

In step S43, BIOS is linked to the cloud server.

The network driver configuration is initialized by the BIOS according to the trigger operation for invoking the system file which is transmitted by the user, so that the network of the terminal device can be used normally. Through the network, the BIOS is linked with the cloud server, so as to acquire system files pre-stored in the cloud server, such as system installation files, system update files, or system recovery files.

In step S44, the device identifier is uploaded.

In the embodiments of the present disclosure, the uploaded device identifier can be encrypted.

In step S45, a corresponding system file is acquired from the cloud server.

In step S46, the acquired system file is installed.

The BIOS performs a self-installation based on the downloaded system ISO file, so that the system file can run normally on the terminal device.

In step S47, the terminal device is turned on normally.

After the system files are installed, the terminal device is restarted, which is convenient for the BIOS to initialize the newly installed system, so that the new system can start and provide normal use.

Through the above embodiments, the difficulty that the user needs to recover the system through complicated operations, which is caused by the system crash or a missing system file during the replacement of the hard disk, can be effectively solved. The user only needs to transmit a trigger operation for invoking a system file, and then the system ISO file can be self-installed or updated by the BIOS to complete the system installation, update, or recovery, which is convenient and fast, not limited by the computer knowledge, and the installation and operation are simple.

Figure 5:
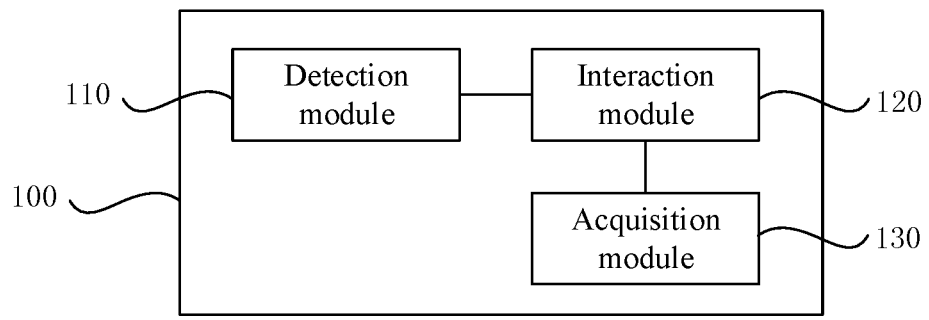
FIG. 5 is a block diagram illustrating an apparatus for invoking a system file according to some embodiments.

FIG. 5 is a block diagram of an apparatus for invoking a system file according to some embodiments. Referring to FIG. 5, the apparatus includes: a detection module 110, an interaction module 120, and an acquisition module 130.

The detection module 110 is configured to detect, during a startup process, a trigger operation that is input.

The interaction module 120 is configured to establish a link with a cloud server, in response to the detecting of the trigger operation, and the trigger operation is used to trigger an invocation to the system file.

The acquisition module 130 is configured to invoke, based on the link, the system file from the cloud server.

In some embodiments, before establishing a link with the cloud server, the interaction module 120 is further configured to initialize a network driver configuration. The interaction module 120 is configured to establish a link with the cloud server by adopting the following mode: establishing the link with the cloud server based on the initialized network driver configuration.

In some embodiments, the acquisition module 120 invokes, based on the link, the system file from the cloud server by adopting the following modes: uploading, based on the link, a device identifier to the cloud server, the device identifier being used to identify a terminal device invoking the system file; and acquiring the system file determined by the cloud server based on the device identifier and matched with the device identifier.

In some embodiments, uploading, based on the link, a device identifier to the cloud server includes: encrypting the device identifier; and uploading the encrypted device identifier to the cloud server based on the link.

In some embodiments, the system file includes a system installation file, a system update file, or a system recovery file; and the trigger operation includes a hot key trigger operation, a typing operation of an input/output system options, or a typing operation of key combination.

With respect to the apparatus in the above embodiments, the specific manners for performing operations for individual modules therein have been described in detail in the embodiments regarding the methods for invoking the system files, which will not be elaborated herein.

Figure 6:
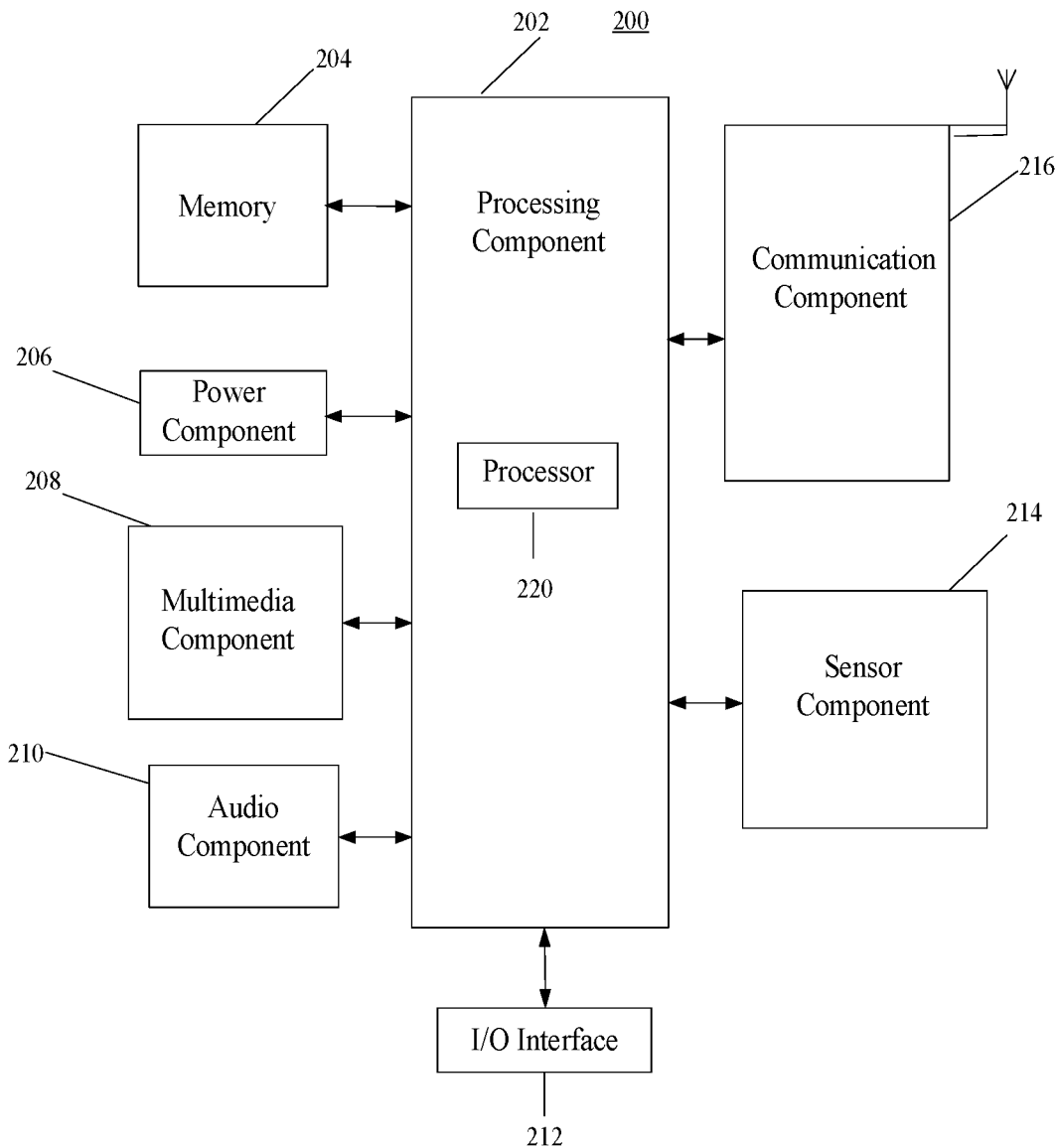
FIG. 6 is a block diagram illustrating another apparatus for invoking a system file according to some embodiments.

FIG. 6 is a block diagram of an apparatus 200 for invoking a system file, according to some embodiments. For example, the apparatus 200 can be a mobile phone, a computer, a digital broadcast terminal, a messaging device, a gaming console, a tablet, a medical device, exercise equipment, a personal digital assistant, and the like.

Referring to FIG. 6, the apparatus 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 can include a power management system, one or more power sources, and any other components associated with the generation, management, and distribution of power in the apparatus 200.

The multimedia component 208 includes a screen providing an output interface between the apparatus 200 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the apparatus 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the apparatus 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the apparatus 200. For instance, the sensor component 214 can detect an open/closed status of the apparatus 200, relative positioning of components, e.g., the display and the keypad, of the apparatus 200, and the sensor component 214 can also detect a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as Wi-Fi, 2G, 3G, 4G, 5G and a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 204 including instructions, executable by the processor 220 in the apparatus 200, for performing the above-described methods. For example, the non-transitory computer-readable storage medium can be a ROM, a RAM, a CD-ROM, a magnetic tape, a floppy disc, an optical data storage device, and the like.

A non-transitory computer-readable storage medium, when instructions stored in the storage medium are executed by a processor of a mobile terminal, causes the mobile terminal to execute any one of the above-mentioned method for invoking a system file.

Figure 7:
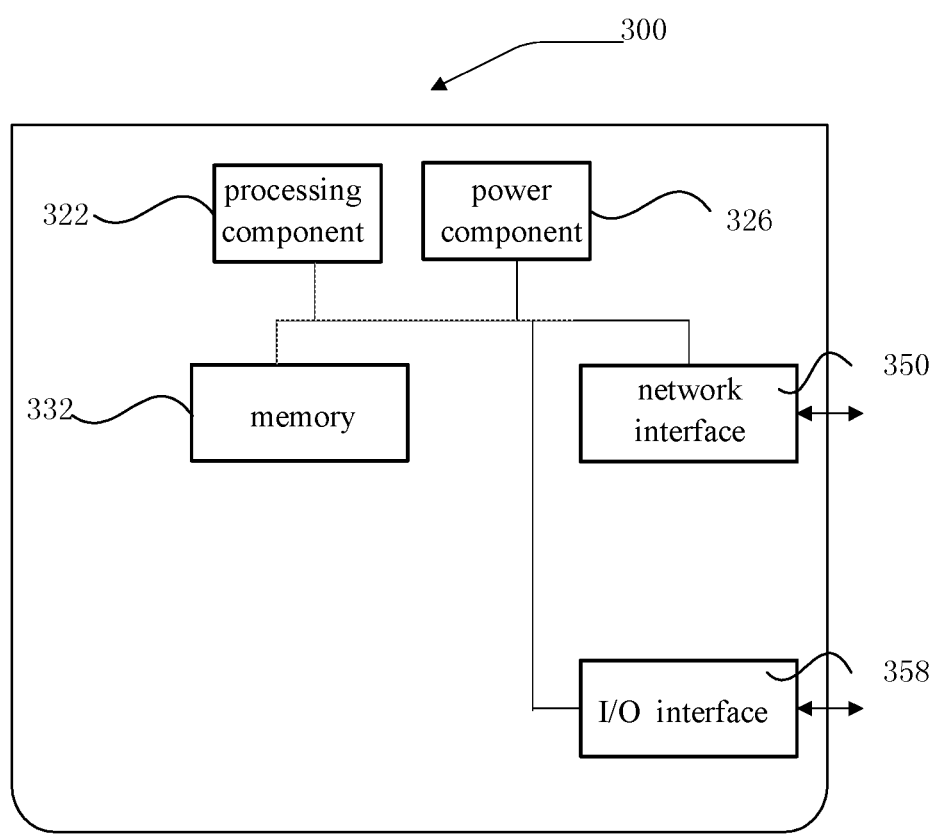
FIG. 7 is a block diagram illustrating yet another apparatus for invoking a system file according to some embodiments.

FIG. 7 is a block diagram of an apparatus 300 for invoking a system file, according to some embodiments. For example, the apparatus 300 can be provided as a server. Referring to FIG. 7, the apparatus 300 can include a processing component 322 which further includes one or more processors, and a memory resource represented by a memory 332 for storing instructions executable by the processing component 322, such as application programs. The application programs stored in the memory 332 can include one or more modules, each of which corresponding to a set of instructions. Furthermore, the processing component 322 can be configured to execute the instructions to perform any one of the above-mentioned methods for invoking a system file.

The apparatus 300 can also include a power supply 326 configured to perform a power management of the apparatus 300, a wired or wireless network interface 350 configured to connect the apparatus 300 to the network, and an input/output interface 358. The apparatus 300 can be operated based on an operating system stored in the memory 332, such as Windows Server™, Mac OS X™, Unix™, Linux™, FreeBSD™, or the like.

Various embodiments of the present disclosure can have one or more of the following advantages. A link can be established with the cloud server when a user-triggered operation is received, a system file can be invoked from the cloud server, and an invocation to the system file can be achieved.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for invoking a system file of a system, the method comprising:
 detecting, through a basic input output system (BIOS), during a startup process, a trigger operation that is input;
 establishing a secure link with a cloud server based on an encryption protocol, in response to the detecting of the trigger operation being used to trigger an invocation to the system file;
 invoking, based on the link, the system file from the cloud server by:
 uploading, based on the link, a device identifier to the cloud server, the device identifier being used to identify a terminal device invoking the system file; and
 acquiring the system file determined by the cloud server based on the device identifier and matched with the device identifier, and self-installing the acquired system file on the terminal device through the BIOS,
 wherein prior to said establishing the secure link with the cloud server, the method further comprises:
 initializing, through the BIOS, a network driver configuration when the system crashes and cannot be started; and establishing the link with the cloud server based on the initialized network driver configuration.

2. The method according to claim 1, wherein
the system file comprises a system installation file, a system update file, or a system recovery file; and
the trigger operation comprises a hot key trigger operation, a typing operation of input/output system options, or a typing operation of key combination.

3. The method according to claim 1, wherein
the system file comprises a system installation file, a system update file, or a system recovery file; and
the trigger operation comprises a hot key trigger operation, a typing operation of input/output system options, or a typing operation of key combination.

4. The method according to claim 1, wherein
the system file comprises a system installation file, a system update file, or a system recovery file; and
the trigger operation comprises a hot key trigger operation, a typing operation of input/output system options, or a typing operation of key combination.

5. The method according to claim 1, wherein said uploading, based on the link, a device identifier to the cloud server comprises:
encrypting the device identifier; and
uploading the encrypted device identifier to the cloud server based on the link.

6. A non-transitory computer-readable storage medium having stored therein instructions for execution by a processor to implement the method for invoking a system file according to claim 1.

7. The non-transitory computer-readable storage medium according to claim 6, wherein prior to said establishing a link with the cloud server, the method further comprises:
initializing a network driver configuration; and
said establishing a link with a cloud server comprises:
establishing the link with the cloud server based on the initialized network driver configuration.

8. The non-transitory computer-readable storage medium according to claim 6, wherein said uploading, based on the link, a device identifier to the cloud server comprises:
encrypting the device identifier; and
uploading the encrypted device identifier to the cloud server based on the link.

9. A mobile terminal implementing the method according to claim 1, wherein the mobile terminal is configured to perform recovery or update of an operating system of the mobile terminal, by said invoking, based on the link, the system file from the cloud server, in a case that the operating system crashes or a local system file of the mobile terminal cannot be used normally due to damage or missing of the local system file; and wherein the mobile terminal is configured to establish the link with the cloud server by performing three interactions according to a three-way handshake protocol.

10. An apparatus for invoking a system file of a system, the apparatus comprising:
memory storing instructions; and
a processor configured to execute the instructions stored in the memory,
wherein the processor is configured to:
detect, through a basic input output system (BIOS), during a startup process, a trigger operation that is input;
establish, through the BIOS, a secure link with a cloud server based on an encryption protocol, in response to the detecting of the trigger operation being used to trigger an invocation to the system file; and
invoke, based on the link, the system file from the cloud server by:
uploading, based on the link, a device identifier to the cloud server, the device identifier being used to identify a terminal device invoking the system file; and
acquiring the system file determined by the cloud server based on the device identifier and matched with the device identifier, and self-installing the acquired system file on the terminal device through the BIOS,
wherein the processor is further configured to:
initialize, through the BIOS, a network driver configuration when the system crashes and cannot be started before establishing a link with the cloud server; and
establish the link with the cloud server based on the network driver configuration initialized by an initialization module.

11. The apparatus according to claim 10, wherein
the system file comprises a system installation file, a system update file, or a system recovery file; and
the trigger operation comprises a hot key trigger operation, a typing operation of input/output system options, or a typing operation of key combination.

12. The apparatus according to claim 10, wherein
the system file comprises a system installation file, a system update file, or a system recovery file; and
the trigger operation comprises a hot key trigger operation, a typing operation of input/output system options, or a typing operation of key combination.

13. The apparatus according to claim 10, wherein
the system file comprises a system installation file, a system update file, or a system recovery file; and
the trigger operation comprises a hot key trigger operation, a typing operation of input/output system options, or a typing operation of key combination.

14. The apparatus according to claim 10, wherein said uploading, based on the link, a device identifier to the cloud server comprises:
encrypting the device identifier; and
uploading the encrypted device identifier to the cloud server based on the link.

* * * * *